United States Patent
Becker et al.

(10) Patent No.: US 12,348,292 B2
(45) Date of Patent: Jul. 1, 2025

(54) AVERAGED BEAMFORMING FOR SATELLITE COMMUNICATION

(71) Applicant: Hughes Network Systems, LLC, Germantown, MD (US)

(72) Inventors: Neal David Becker, Olney, MD (US); Udaya Bhaskar, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 53 days.

(21) Appl. No.: 18/524,111

(22) Filed: Nov. 30, 2023

(65) Prior Publication Data

US 2025/0183972 A1    Jun. 5, 2025

(51) Int. Cl.
*H04B 7/06*    (2006.01)
*H04B 7/0426*    (2017.01)

(52) U.S. Cl.
CPC .......... *H04B 7/0634* (2013.01); *H04B 7/043* (2013.01)

(58) Field of Classification Search
CPC .............................. H04B 7/0634; H04B 7/043
See application file for complete search history.

(56) References Cited

U.S. PATENT DOCUMENTS

2023/0370156 A1* 11/2023 Sedwick .............. H04B 7/1855
2025/0019395 A1* 1/2025 Pepin ....................... C07K 1/36
2025/0070840 A1* 2/2025 Jeon ...................... H04B 7/0456

OTHER PUBLICATIONS

International Search Report and Written Opinion issued Mar. 12, 2025 in PCT/US2024/056579.
Majidi et al., "Preceding and Scheduling in Multibeam Multicast NOMA based Satellite Communication Systems", 2021 IEEE International Conference on Communications Workshops (ICC Workshops), IEEE, Jun. 14, 2021 (Jun. 14, 2021), pp. 1-6.

* cited by examiner

*Primary Examiner* — Vineeta S Panwalkar
(74) *Attorney, Agent, or Firm* — Novo TechIP International PLLC

(57) ABSTRACT

A beamforming system for an antenna for satellite communications, where the antenna includes an array of radiating elements, the system including: a processor programmed to implement a set of averaging functions, the processor programmed to receive channel vectors representing responses from a center and other locations in each of a number of cells to be served, the averaging functions to produce an average channel vector for each cell based on an average of the channel vectors received from a corresponding cell; the processor further programmed to calculate a beam weight vector for each cell based on a corresponding average channel vector; and a beamformer to generate a beamforming matrix from the beam weight vectors and to use the beamforming matrix to drive the elements of the antenna to beamform a beam from the antenna.

20 Claims, 8 Drawing Sheets

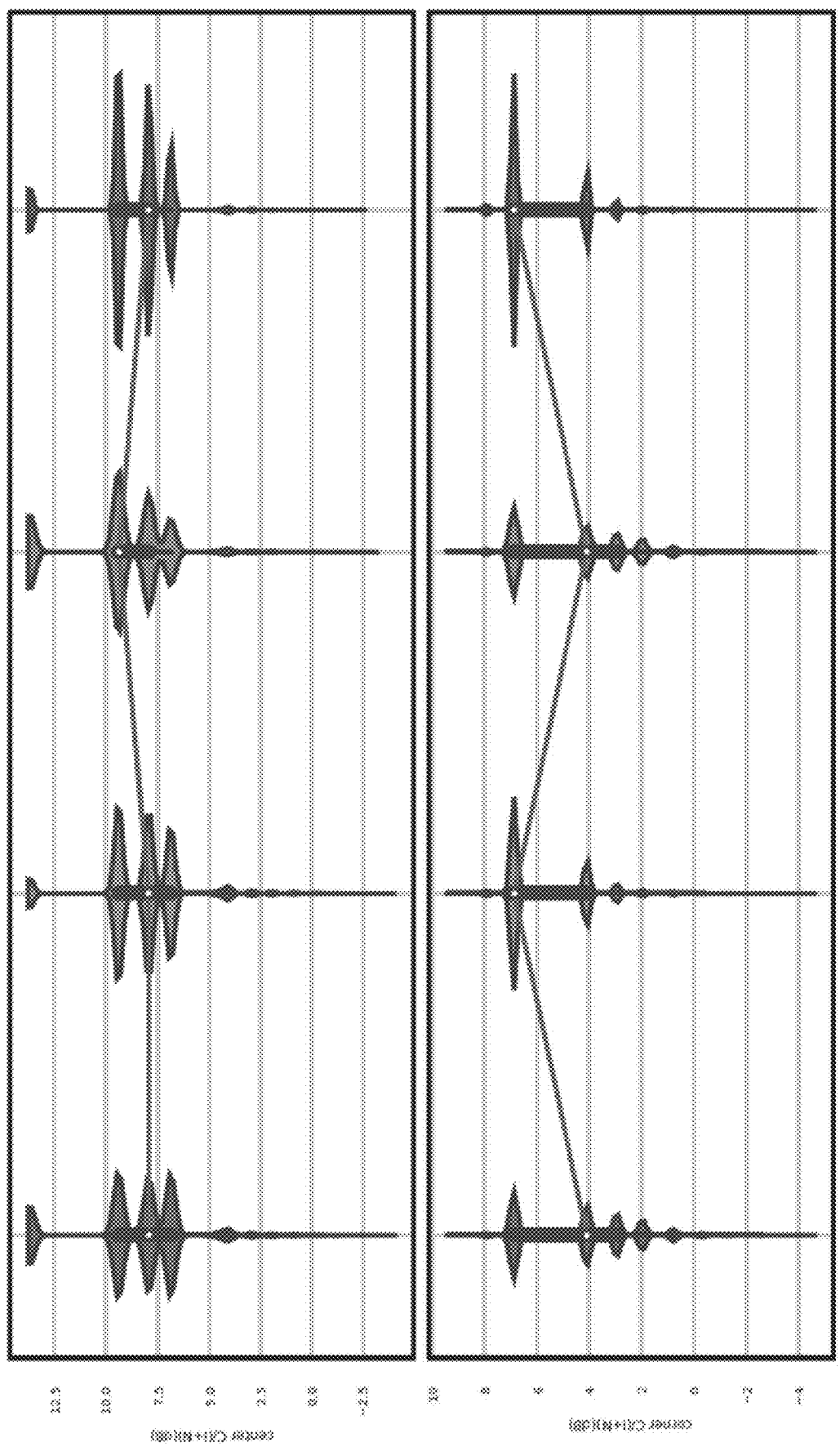

AVERAGED BEAMFORMING FOR SATELLITE COMMUNICATION

BACKGROUND

Satellite networks have become an integral part of modern telecommunications infrastructure. These systems facilitate global connectivity, enabling services such as television broadcasting, internet access, and remote sensing, among others. To meet the increasing demands for high-speed data transmission, reliability, and efficiency, satellite communication systems have evolved significantly. For example, traditional satellite communication systems often employed omnidirectional antennas, which transmit and receive signals in all directions uniformly. While omnidirectional transmission was suitable for certain applications, it presented limitations when aiming to achieve higher data throughput, signal quality, and interference mitigation.

Beamforming is a signal processing technique that has emerged as a fundamental advancement in satellite communications. Traditional satellite antennas are not omnidirectional but rather form fixed pre-defined beam patterns using e.g., parabolic antennas. In contrast, beamforming is performed using phased arrays so that the beam patterns can be dynamically defined and rapidly changed to meet varying requirements. Consequently, beamforming plays a pivotal role in enhancing the performance and capabilities of satellite communication systems.

Specifically, beamforming enables the focusing of transmitted signals toward intended recipients, such as ground stations or user terminals. Concentrating signal energy improves the signal-to-noise ratio and mitigates signal degradation over long-distance communication links. Also, by directing signals precisely toward targeted areas, beamforming substantially enhances data throughput capacity. Increased data throughput is important in satellite internet services, video streaming, and other data-intensive applications that demand high-speed and reliable connections. Satellite communication signals are also susceptible to interference from neighboring satellites and terrestrial sources. Beamforming allows for the selective reception and transmission of signals from specific directions, thus reducing interference and enhancing system reliability.

Beamforming technology also enables satellites to dynamically adjust their beam patterns to cover varying geographical regions and user demands. Such adaptability optimizes resource allocation and ensures efficient utilization of satellite resources. Lastly, by concentrating signal energy in desired directions, beamforming reduces the need for high-power transmissions, contributing to improved energy efficiency in satellite communication systems.

SUMMARY

In one aspect the following description explains a beamforming system for an antenna for satellite communications, where the antenna includes an array of radiating elements, the system including: a processor programmed to implement a set of averaging functions, the processor programmed to receive channel vectors representing responses from a center and other locations in each of a number of cells to be served, the averaging functions to produce an average channel vector for each cell based on an average of the channel vectors received from a corresponding cell; the processor further programmed to calculate a beam weight vector for each cell based on a corresponding average channel vector; and a beamformer to generate a beamforming matrix from the beam weight vectors and to use the beamforming matrix to drive the elements of the antenna to beamform a beam from the antenna.

In another aspect, the following description explains a method of beamforming for an antenna for satellite communications, where the antenna includes an array of radiating elements. The method includes: averaging channel vectors representing responses from a center and other locations in each of a number of cells to be served by the antenna, the averaging to produce an average channel vector for each cell based on an average of the channel vectors from a corresponding cell; calculating a beam weight vector for each cell based on a corresponding average channel vector; and beamforming a beam from the antenna based on the beam weight vectors.

In yet another aspect, the following description explains a method of beamforming for an antenna for satellite communications, where the antenna includes an array of radiating elements. The method includes: receiving a set of channel vectors for satellite-to-cell transmission for each of a number of cells served by the antenna, the set of channel vectors comprising a vector for a center and each of other multiple locations of a target cell; averaging the set of channel vectors, the averaging to produce an average channel vector for each of the number of cells; calculating a beam weight vector for each of the number of cells based on a corresponding average channel vector; and beamforming a beam from the antenna to each of the number of cells based on a corresponding beam weight vector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1 also illustrates interference between Low Earth Orbit (LEO) and Medium Earth Orbit (MEO) satellites.

FIG. 2 also illustrates both intrasatellite and intrasatellite interference between satellites in different LEO constellations.

FIG. 5A illustrates the system transmitting a beam to cells being served. FIG. 5B illustrates the system receiving a beam from the cells being served.

FIG. 6 depicts a comparison of signal to noise ratio at the center and corners of a cell using two different beamforming techniques and including and omitting the averaging of channel vectors according to principles described herein.

DETAILED DESCRIPTION

As noted above, satellite communications and networks have seen widespread growth. Different operators launch their own separate networks of satellites, each referred to as a constellation. A constellation can occupy LEO altitudes or MEO altitudes. There are also higher satellites that are in geosynchronous orbit (GEO).

For LEO and MEO constellations that are not in geosynchronous orbit, the position of the satellites in the constellation is constantly changing as viewed from a ground station on earth. Because of the proliferation of different constellations, two non-geosynchronous satellites from different constellations may periodically move into conjunction or appear very close to each other from the perspective of a ground station on earth. Also, a non-geosynchronous satellite may move in front of, or close to being in front of, a geosynchronous satellite from the perspective of the ground station. In any of these situations, attempted communications between a terrestrial terminal and one of the satellites may experience interference from the other satellite.

Figure 1:
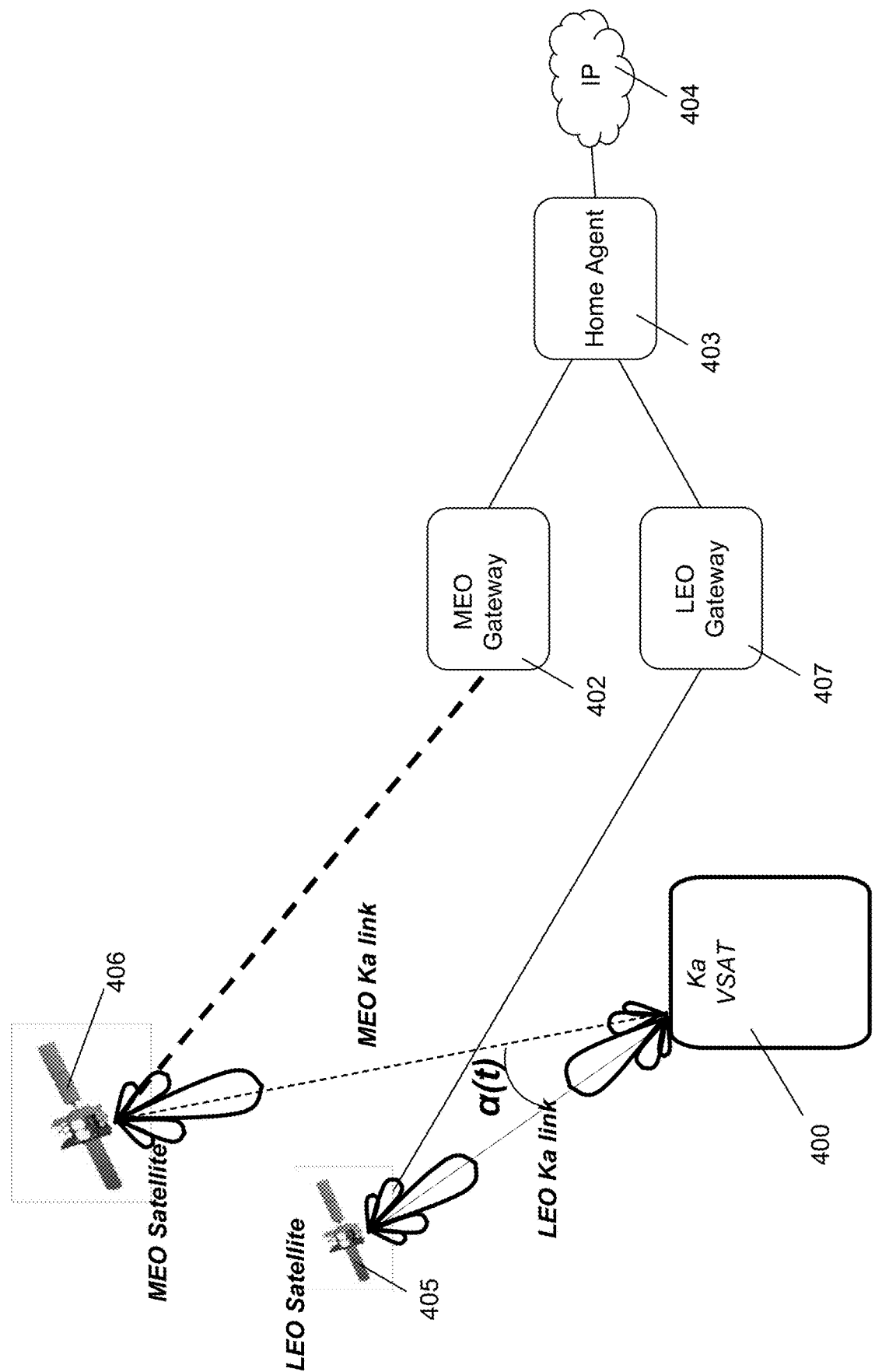
FIG. 1 illustrates an example satellite communication system in which the principles described herein can be implemented.

FIG. 1 illustrates an example satellite communication system in which the principles described herein can be implemented. In the example of FIG. 1, a user terminal 400 is in a location that has no terrestrial connection with a target or destination network, such as the Internet or another network. Consequently, communication is provided for the terminal 400 to the target network 404 by satellite, as described in further detail below. In this example, the user terminal 400 is a Very Small Aperture Terminal (VSAT). VSATs are commonly used for the transmission and reception of data, voice and video signals over a satellite communication network.

FIG. 1 also illustrates the potential for interference between LEO and MEO satellites. As seen in FIG. 1, an LEO satellite 405 provides communication between the user terminal 400 and an LEO gateway 407. Additionally in FIG. 1, there is an MEO constellation, and one of the MEO satellites 406 provides communication between the user VSAT 400 and an MEO gateway 402. Both gateways 407, 402 communicate through a home agent 403 with the destination network 404, e.g., an Internet Protocol (IP) network such as the internet.

In this example, α(t) is the separation angle between the LEO satellite 405 and MEO satellite 406 as seen by the VSAT 400. The separation angle will constantly change as a function of time as both LEO and MEO constellations are moving with respect to the VSAT 400. Below a lower threshold of the angle α(t), the VSAT 400 will experience interference between the two satellites if trying to communicate with either one.

As shown in FIG. 1, the signals from a satellite or a user terminal naturally have a shape that includes a main lobe, representing maximum signal strength, pointed in the direction of the communication. On either side of the main lobe are smaller side lobes with a direction that is at an angle to the desired direction of the signal. If there is insufficient angular separation between satellites, these sidelobes may still cause inter-constellation interference and degrade communication with the VSAT 400 as shown in FIG. 1. Consequently, suppression of these side lobes has been used as a technique in the industry to mitigate the interference.

The primary goal of sidelobe suppression is to minimize the power or energy present in these sidelobes while preserving the desired signal in the main lobe that is centered on the satellite being linked. Beamforming is one of various signal processing techniques that have been used in the industry for sidelobe suppression. In array signal processing, beamforming algorithms are employed to focus the transmitted or received signal towards the desired direction while suppressing sidelobes in other directions. Specifically, it is possible to use beamforming algorithms such as MMSE to minimize the interference falling onto specific directions where it may be harmful to other users. Adaptive beamforming techniques can dynamically adjust the array weights to enhance the main lobe and attenuate or modify sidelobes.

A steerable satellite antenna utilizes several components to achieve beamforming. First, it incorporates an array of individual radiating elements, often in the form of patch antennas or horn antennas. To control the direction of the beam, phase shifters are employed to adjust the phase of the signals sent to each radiating element. The phase manipulation leads to constructive interference in the desired direction, forming a focused beam.

Additionally, amplitude weighting elements control the strength of the signals sent to each radiating element, enabling further beam shaping, By carefully adjusting the phase and amplitude of each element's signal, the antenna can steer the beam in real-time, allowing communication with different ground stations or coverage of specific regions without physically reorienting the satellite or ground antenna. The adaptive beamforming capability enhances the satellite's flexibility and efficiency in data transmission and reception.

Figure 2:
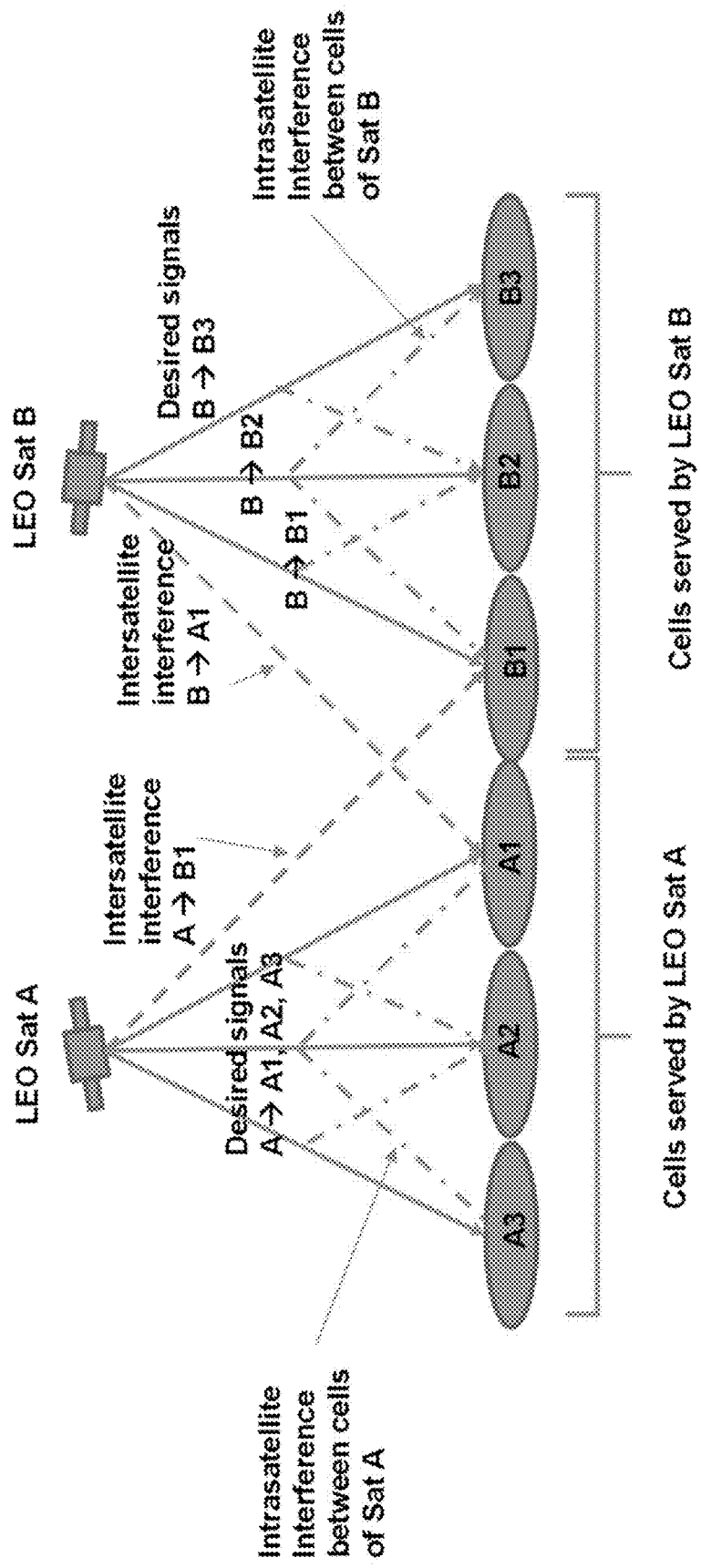
FIG. 2 illustrates the approach of considering a channel response from other locations in a cell rather than only at the cell center according to the principles described herein another example satellite communication system in which the principles described herein can be implemented.

FIG. 2 illustrates another example of a satellite communication system in which the principles described herein can be implemented. FIG. 2 also illustrates both intrasatellite interference for a single satellite and intersatellite interference between satellites in different Low LEO constellations. As shown in FIG. 2, a first LEO satellite A is serving a number of cells on the ground, indicated as A1, A2 and A3. A cell is a geographic area served by a satellite. In some examples, each cell may have a hexagonal shape. A cell may or may not contain a user terminal receiving communications.

Alternatively, beamforming and the associated techniques for reducing interference can be used directly in a "cell-free" approach in which the beamforming is optimized for each of the ground users individually at the time of transmission to each user. However, for many practical reasons, it is often desirable to divide the coverage area into fixed cells on the ground, as shown in FIG. 2. As will be discussed in further detail below, when a cell configuration is used, the channel response from the satellite to the cell is typically with respect specifically to the respective centers of the cells addressed by that satellite.

Returning to FIG. 2, the desired signals in the system are those signals from each satellite to the respective set of cells each satellite serves, e.g., the signals from satellite A to each of the cells A1, A2 and A3. By signal steering, as described above, satellite A can direct a signal to each of the cells being served. However, as also shown in FIG. 2, there may be interference, referred to as intrasatellite interference, between the signals to and from the cells being served by satellite A. Additionally, another LEO satellite, satellite B, serves an adjacent set of cells, indicated as B1, B2 and B3. In this case, intersatellite interference may occur between the signals from satellite B to each of the cells, B1, B2 and B3.

As also shown in FIG. 2, there may be intersatellite interference between satellites A and B when any of the cells receives part of the signal from the other satellite that serves the other cell group. Specifically, as shown in FIG. 2, signals from satellite A may be received by cell B1, and signals from satellite B may be received by cell A1. The interference degrades the desired communication between a cell and its corresponding satellite. However, beamforming can be used to mitigate the interference.

Consider the forward link from the satellite to ground stations on the earth surface (a similar description will apply in the return direction). As noted above, to maximize the performance of such satellites, beamformers and beamforming techniques are often employed that involve, for example, Direct Radiating Array (DRA) antennae. Many techniques are known in the literature for optimizing the performance of such beamformers.

Figure 3:
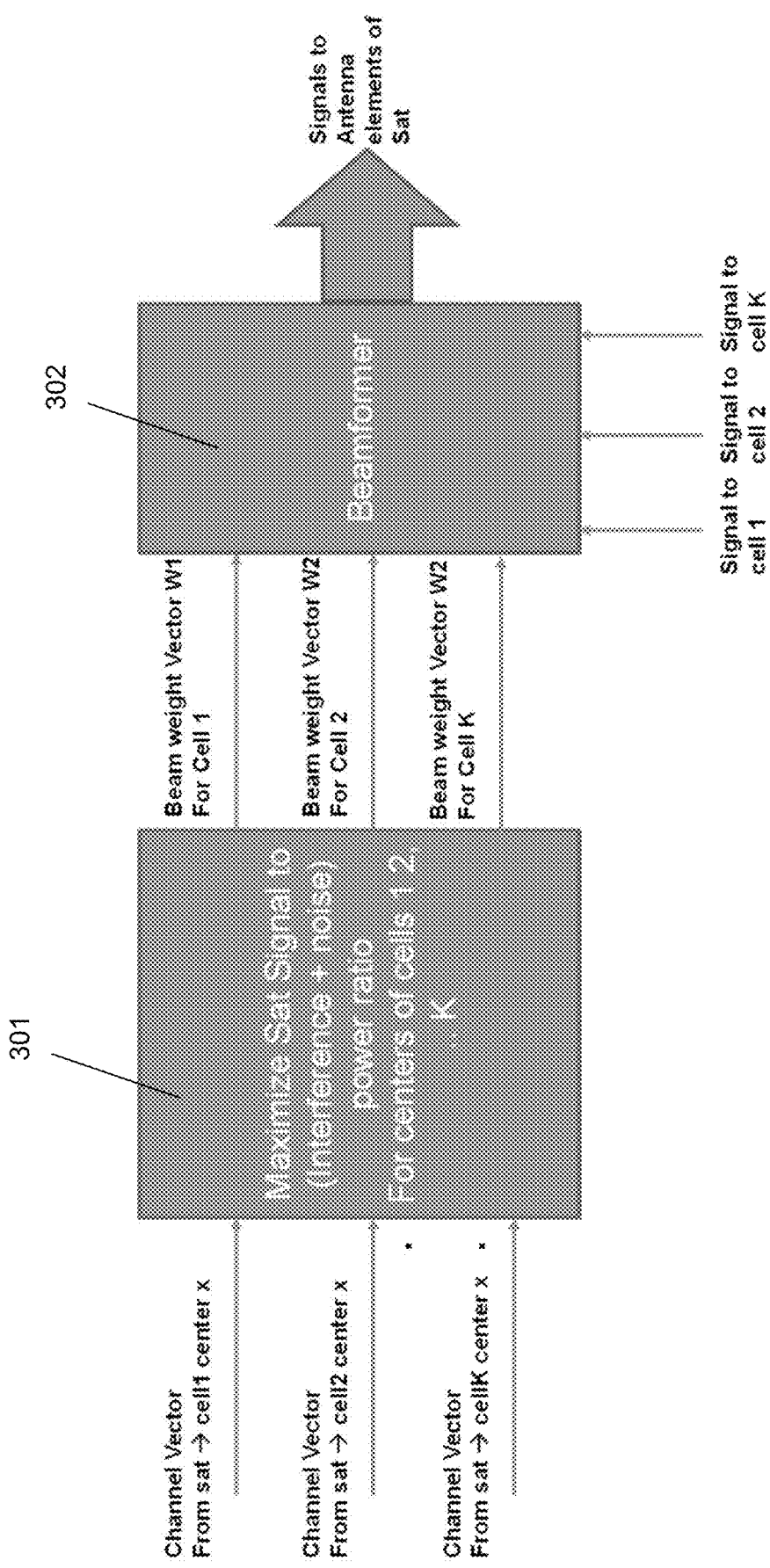
FIG. 3 illustrates an example of a satellite beamforming system. The illustrated system is for a satellite serving a number of cells indicated as cell1 to cellK.

Mathematically, the beamforming operation can be described as a matrix multiplication. Given a vector of signals as inputs to each of multiple beams x, the vector of inputs to each of the radiating elements of the antenna array y can be described by:

$$y = Wx$$

where W is the beam weight matrix,

FIG. 3 illustrates an example of a satellite beamforming system. The illustrated system is for a satellite serving a number of cells indicated as cell1 to cellK. As shown in FIG. 3, a processor 301 receives a channel vector between the satellite and each of the cells being served. These inputs to the processor 301 are illustrated as arrowed lines coming into the processor 301 from the left in FIG. 3. Each vector represents the response between each radiating element of the antenna array and the corresponding cell as measured from the center of each cell. Using all the input channel vectors, the processor will calculate a weight for each of the vectors so as to maximize the ratio of signal power over noise and interference power (SINR). Methods for calculating these beam forming weights will be further discussed below.

The processor 301 then outputs a beam weight vector for each channel vector. The beam weight vectors are input to a beamformer 302. The beamformer 302 also receives the set of signals that includes the signal that is to be sent to each of the individual cells. These inputs are illustrated as arrowed lines coming into the beamformer from below in FIG. 3 and are labeled as the signal to cell1 to cellK. The beamformer 302 uses the beam weight vector for each cell to optimally shape the signal being sent to that cell. The beamformer 302 then outputs a corresponding driver signal to the individual elements of the array of the antenna of satellite B. Thus, the beam from the antenna is formed according to the beam weight vectors under control of the beamformer 302 to mitigate interference.

There are many well-known methods to calculate the beam forming weights W. The matrix H is the channel response from each antenna element to each of the receivers on the earth. Mathematically, an optimization of the matrix W can be formulated based on the matrix H, with different optimization criteria leading to different approaches. Processor 301 performs the calculation of the beam forming weights, described above.

As an example, Minimum Mean Square Error (MMSE) beamforming is a signal processing technique that includes the use of calculated beam forming weights. The primary objective of MMSE beamforming is to minimize the mean square error (MSE) between the desired signal and the received signal while accounting for the noise and interference in the channel. MMSE beamforming is often employed in scenarios where multiple antenna elements are used at the receiver (receiving array). Each antenna receives a slightly different version of the transmitted signal due to variations in the wireless channel, and these received signals can interfere with each other. MMSE beamforming uses the spatial properties of the received signals. It takes advantage of the fact that signals arriving from different directions will experience different channel conditions, leading to differences in the received amplitudes and phases at each antenna element.

A key idea behind MMSE beamforming is to apply complex weights to each antenna's received signal. These weights are carefully chosen to maximize the signal-to-interference-plus-noise ratio (SINR) at the output, which means enhancing the desired signal while suppressing interference and noise. The complex weights are optimized to minimize the MSE between the estimated transmitted signal and the received signal. The optimization takes into account the statistical properties of the channel, noise, and interference. By intelligently adjusting the weights, MMSE beamforming can effectively cancel out or reduce the impact of interfering signals, especially when they arrive from directions different from the desired signal. MMSE beamforming can be adaptive, meaning that it can continuously adjust the weights based on the changing channel conditions. Adaptability ensures that the beamforming technique remains effective in dynamic environments.

In the current example, MMSE leads to the formulation:

$$W_{MMSE} = (H^H H + \lambda I)^{-1} H^H$$

where $(\cdot)^H$ superscript denotes Hermitian (conjugate transpose), and the choice of $\lambda$ depends on the optimization problem.

As noted above, this approach can be used directly in a "cell-free" approach in which the beamforming is optimized for each of the ground users individually at the time of transmission to each user. However, for many practical reasons, it is often desirable to divide the coverage area into fixed cells on the ground. In this case, H might be the channel response from the satellite to the centers of the cells addressed by that satellite. Application of beamforming e.g., MMSE beamforming, using this H will optimize results at the cell center but will ignore the performance at the cell edges. The result of such an approach can be a significant difference between cell center and cell edge in terms of important metrics such as C/(I+N) (signal to interference+noise ratio).

To improve on this result, the following describes a method that beamforms to fixed cells on the ground while obtaining a more balanced performance between cell centers and cell edges. The improved beamforming is produced by using a value for H representing, not the cell center, but an average of different cell positions.

Figure 4:
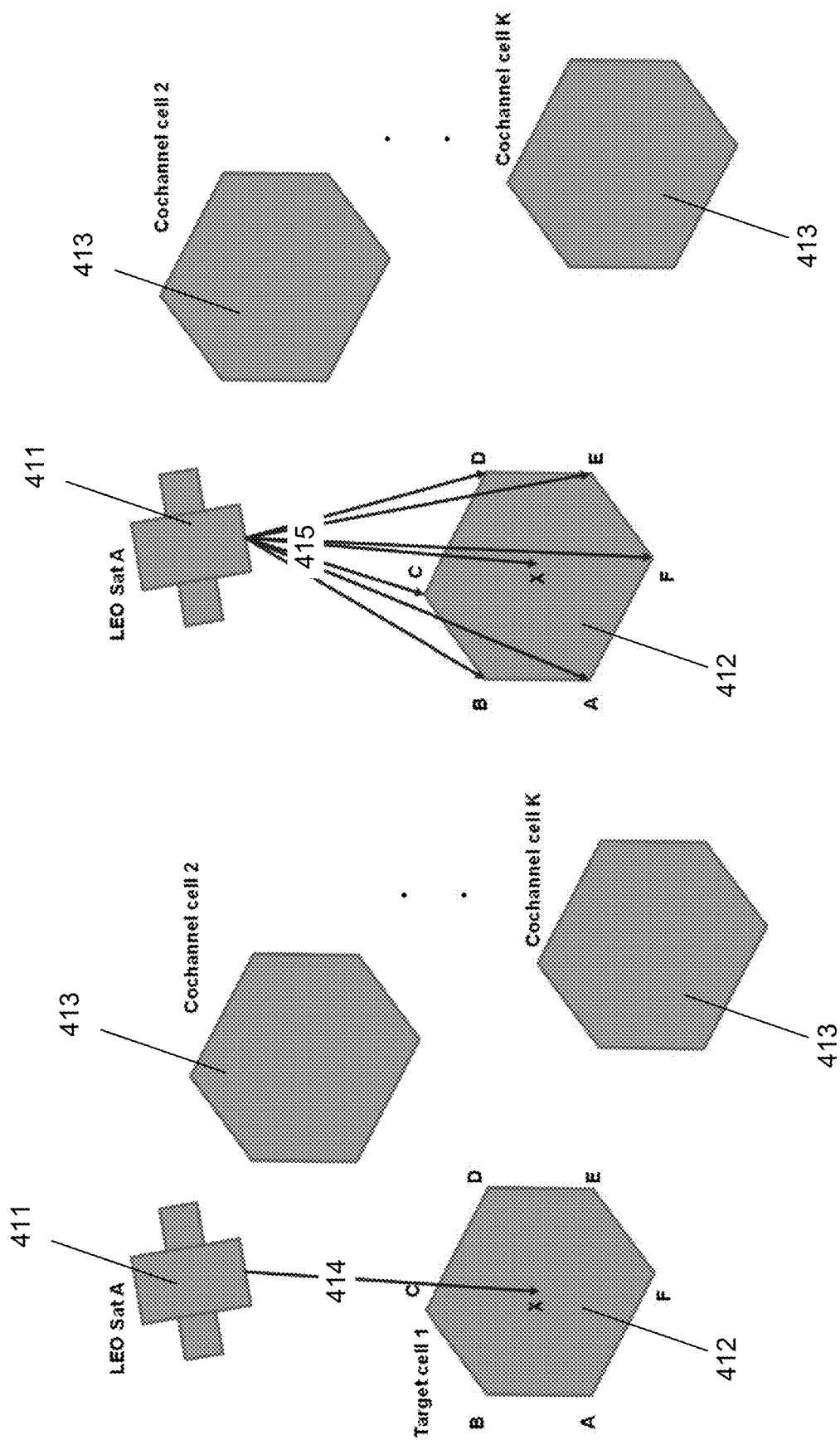
FIG. 4 illustrates the approach of utilizing channel vectors from both the center and other locations of a cell for beamforming according to principles described herein.

For example, the cells on the ground may have a hexagonal shape, as shown in FIG. 4. On the left in FIG. 4, a satellite 411 (LEO Sat A) is transmitting to a target cell 412 as among a number of hexagonal cells 413 (cochannel cells 2-K). As shown, the satellite 411 is beamforming based on a response 414 from the center of the cell 412.

However, as described above, improved beamforming is produced by using a value for H representing, not the cell center, but an average of different cell positions. In the example of FIG. 4, as shown on the left of the figure, the satellite 411 beamforms using responses 415 from the center and the corners of the target cell 412. More specifically, in the case of hexagonal cells on the ground, the method calculates A, for use in the equation above, as an average value $\overline{H}$ where $$\overline{H} = \frac{1}{7}\sum H_i$$

In this equation, $H_i$ are the responses at the cell center and each of the six corners of the hexagonal cell. In other words, the beamforming method uses an H value, indicated as $\overline{H}$, which is an average of the responses at different positions within a cell. This new value, $\overline{H}$, is then used to compute beamforming using the chosen algorithm, such as the MMSE approach described above. Note that for a linear beamforming algorithm, such as MMSE, the resulting beamformer will be the same as the average of the beamformers that target each of the identified cell positions (due to linearity).

Given the practicalities of engineering in the real world and over natural topography, the hexagonal shape of the cells in this example may be an approximately hexagonal shape rather than an ideal hexagonal shape. Additionally, the cells may have approximately some other geometric shape, such as square, pentagon or other geometric shape. In any such example, $\overline{H}$ can be calculated as the average of the response at the cell center and cell corners. In other examples, $\overline{H}$ can be calculated by averaging the response at other locations within the cell, for example, at the center and at a center of each edge of the shape or at a select number of random positions within the cell. Any such approach will provide improved performance across the cell as compared to calculating H using only the response from the cell center.

Figure 5A:
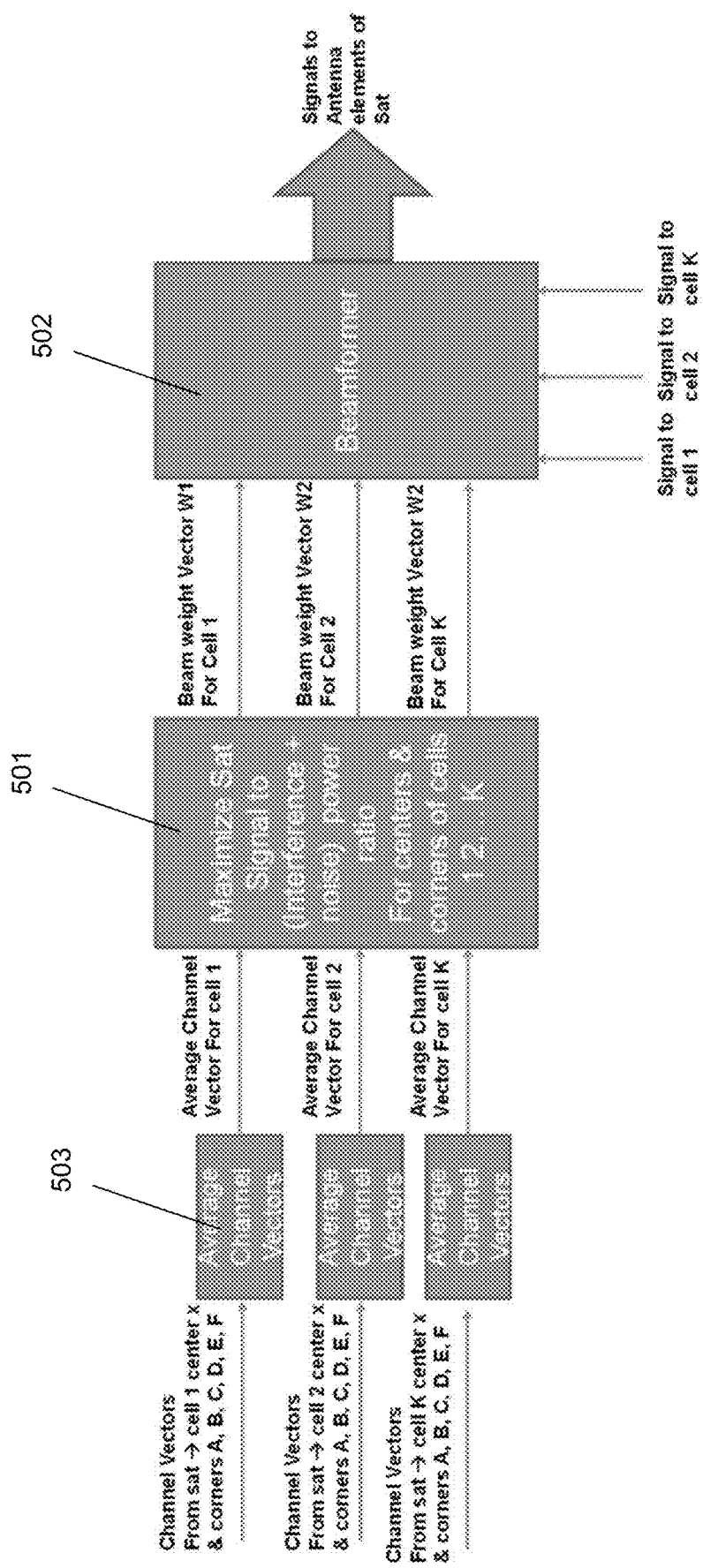
FIGS. 5A and 5B illustrate an example of a satellite beamforming system utilizing channel vectors from both the center and other locations of a cell for beamforming according to principles described herein.

FIG. 5A illustrates an example of a satellite beamforming system that uses an average of responses at different points in a cell for improved performance. The illustrated system is an example for a satellite serving a number of hexagonal cells indicated as cell1 to cellK each having corners A-F. As shown in FIG. 5A, the system receives a channel vector for the response between the satellite and each of the cells being served, where the channel vectors include the response from the center of the cell and from each of the six corners. Each channel vector is processed by an averaging function 503 to produce an average channel vector for each cell. These average channel vectors are input to the processor 501 and are illustrated as arrowed lines coming into the processor 501 from the left in FIG. 5A.

Using all the input average channel vectors, the processor 501 will calculate a beam weight vector for each cell so as to maximize the ratio of signal power over noise and interference power (SINR). Methods for calculating these beam forming weights were described above.

The processor 501 then outputs a beam weight vector for each cell. The beam weight vectors are input to a beamformer 502. The beamformer 502 also receives the set of signals that includes the data or signal that is to be sent to each of the individual cells. These inputs are illustrated as arrowed lines coming into the beamformer from below in FIG. 5A and are labeled as the signal to cell1 to cellK. The beamformer 502 uses the beam weight vector for each cell to optimally shape the signal being sent to the corresponding cell. The beamformer 502 then outputs a corresponding driver signal to the individual elements of the array of the antenna of the satellite. Thus, the beam from the antenna is formed according to the beam weight vectors under control of the beamformer 502 to mitigate interference.

Figure 5B:
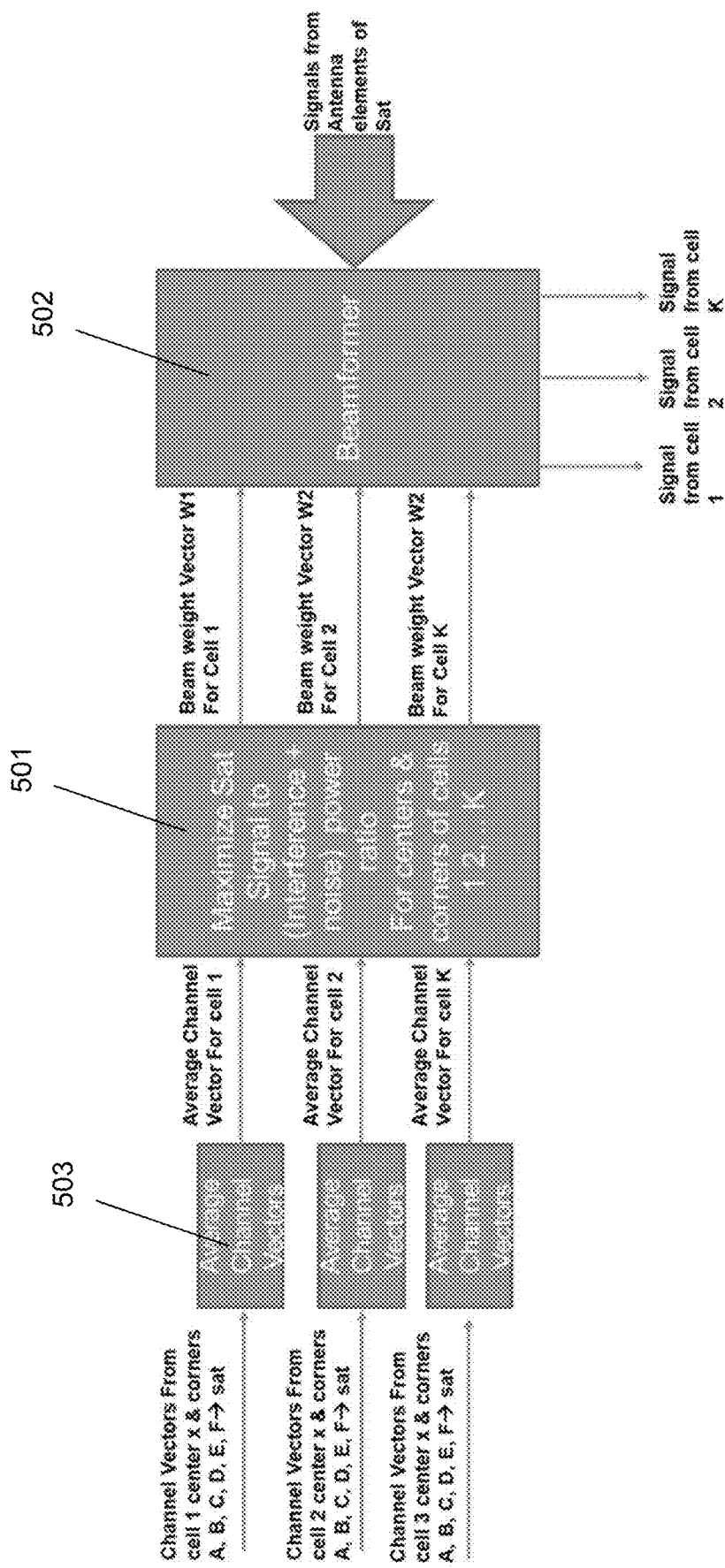

FIG. 5B illustrates the system receiving a beam from the cells being served. As shown in FIG. 5B, the beamformer 502 still receives the beam weight vectors for each of the cells. As described above, these beam weight vectors are produced from average channel vectors that average the channel vectors from the center and other locations, e.g., the corners, of each of the cells. The beamformer 502 uses these beam weight vectors, reflecting the averaged channel values, to extract a data signal for each of the cells, as shown in FIG. 5B.

As an example, FIG. 6 depicts the result of a LEO satellite constellation simulation that uses an average response at different points in a target cell when beamforming transmissions to that cell. Specifically, FIG. 6 shows the C/(I+N) distributions produced by two different beamforming approaches: matched filter (conjugate match) a traditional beamforming algorithm and MMSE, a more advanced beamforming algorithm described above.

The upper box in the figure illustrates the C/(I+N) distributions at the center of a target cell. The lower box illustrates the C/(I+N) distributions at the corners of the target cell. Starting at the left, the first illustrated probability density function shows the response at the center and corners of the target cell using matched filter beamforming based only on the response from the center of the cell for the beamforming, i.e., without average in responses from other locations, such as the corners, of the cell. Moving right, the second illustrated C/(I+N) distributions are for matched filter beamforming using the average, described above, of responses from the center and corners of the target cell.

Continuing to the right, the third illustrated probability density function shows the response at the center and corners of the target cell using MMSE beamforming based only on the response from the center of the cell for the beamforming, i.e., without average in responses from other locations, such as the corners, of the cell. Moving right again, the fourth and last illustrated C/(I+N) distributions are for MMSE beamforming using the average, described above, of responses from the center and corners of the target cell.

As emphasized by the lines between the different distributions, averaging gives significantly improved C/(I+N) distribution at the cell corners as compared to beamforming based only on the center of the cell.

Figure 7:
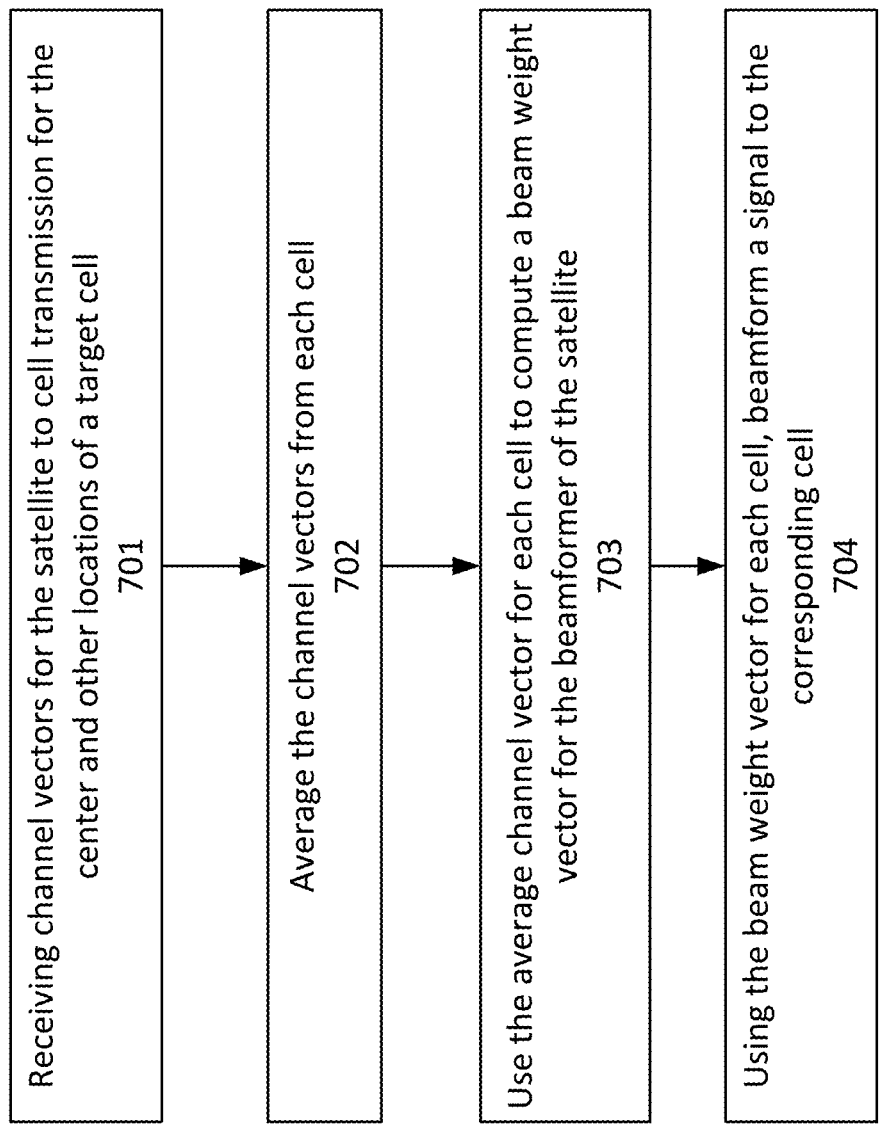
FIG. 7 illustrates a flowchart for satellite beamforming utilizing channel vectors from both the center and other locations of a cell for beamforming according to principles described herein.

FIG. 7 illustrates a flowchart for an example method of beamforming according to the principles described herein. This method is implemented, for example, by the system of FIG. 5A. As shown in FIG. 7, the method begins by receiving channel vectors 701 for the transmission between the satellite and cell for the center of the cell and other locations of the target cell. As described above, the other locations of the target cell may be corners of the geometric shape that defines the cell. However, other locations within the target cell may be used.

Next, the channel vectors for each cell are averaged 702. Specifically, given a target cell, the channel vector for the center of the target cell and other locations of the target cell are averaged together to produce an average channel vector for the target cell. This averaging is conducted, respectively, for each cell to which the satellite is beamforming its transmission.

Using the average channel vector for each cell, the method computes a beam weight vector 703 for the corresponding cell. These beam weight vectors are then input to the beamformer of the satellite. The beamformer, using the beam weight vector for each cell, beamforms the signal to the corresponding cell. As described above, this method provides for an improved transmission, particularly to the corners of the cell, in terms of SINR.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A beamforming system for an antenna for satellite communications, the antenna comprising an array of radiating elements, the system comprising:
a processor programmed to implement a set of averaging functions, the processor programmed to receive channel vectors representing responses from a center and other locations in each of a number of cells to be served, the averaging functions to produce an average channel vector for each cell based on an average of the channel vectors received from a corresponding cell;
the processor further programmed to calculate a beam weight vector for each cell based on a corresponding average channel vector; and
a beamformer to generate a beamforming matrix from the beam weight vectors and to use the beamforming matrix to drive the elements of the antenna to beamform a beam from the antenna.

2. The system of claim 1, wherein the channel vectors representing the other locations in a cell represent corners of a geometric shape defining each cell.

3. The system of claim 2, wherein the geometric shape defining each cell is hexagonal.

4. The system of claim 1, wherein generating the beamforming matrix comprises using Minimum Mean Square Error (MMSE).

5. The system of claim 1, wherein the processor further comprises an input for a signal of data to be transmitted to each, respective, cell, wherein the beamformed beam incorporates the data to be transmitted to a target cell of the respective cells.

6. The system of claim 1, wherein the beamforming system is incorporated into a Low Earth Orbit (LEO) satellite.

7. The system of claim 1, wherein the processor is programmed to calculate each beam weight vector by maximizing a signal to noise and interference power ratio (SINR).

8. A method of beamforming for an antenna for satellite communications, the antenna comprising an array of radiating elements, the method comprising:
averaging channel vectors representing responses from a center and other locations in each of a number of cells to be served by the antenna, the averaging to produce an average channel vector for each cell based on an average of the channel vectors from a corresponding cell;
calculating a beam weight vector for each cell based on a corresponding average channel vector; and
beamforming a beam from the antenna based on the beam weight vectors.

9. The method of claim 8, further comprising generating a beamforming matrix from the beam weight vectors and using the beamforming matrix to drive the elements of the antenna to beamform the beam from the antenna.

10. The method of claim 8, wherein the channel vectors representing the other locations in a cell represent corners of a geometric shape defining each cell.

11. The method of claim 10, wherein the geometric shape defining each cell is hexagonal.

12. The method of claim 8, wherein the beamforming comprises using Minimum Mean Square Error (MMSE).

13. The method of claim 8, further comprising receiving a signal of data to be transmitted to each, respective, cell, wherein the beamformed beam incorporates the data to be transmitted to a target cell of the respective cells.

14. The method of claim 8, further comprising transmitting the beamformed beam from a Low Earth Orbit (LEO) satellite.

15. The method of claim 8, wherein calculating e each beam weight vector is performed by maximizing a signal to noise and interference power ratio (SINR).

16. A beamforming system for an antenna for satellite communications, the antenna comprising an array of radiating elements, the system comprising:
a processor programmed to implement a set of averaging functions, the processor programmed to receive channel vectors representing responses from a center and other locations in each of a number of cells to be served, the averaging functions to produce an average channel vector for each cell based on an average of the channel vectors received from a corresponding cell;
the processor further programmed to calculate a beam weight vector for each cell based on a corresponding average channel vector; and
a beamformer to receive a beamformed signal from the number of cells being served and to produce a data signal for each respective cell being served using the beam weight vectors based on corresponding average channel vectors.

17. The system of claim 16, wherein the channel vectors representing the other locations in a cell represent corners of a geometric shape defining each cell.

18. The system of claim 17, wherein the geometric shape defining each cell is hexagonal.

19. The system of claim 16, wherein beamformer uses Minimum Mean Square Error (MMSE).

20. The system of claim 16, wherein the processor is programmed to calculate each beam weight vector by maximizing a signal to noise and interference power ratio (SINR).

* * * * *